United States Patent [19]

Handy et al.

[11] 4,170,041
[45] Oct. 2, 1979

[54] LOGIC GATE UTILIZING CHARGE TRANSFER DEVICES

[75] Inventors: Roland J. Handy, Northridge; Thomas A. Zimmerman, Palos Verdes Peninsula, both of Calif.

[73] Assignee: TRW Inc., Redondo Beach, Calif.

[21] Appl. No.: 724,140

[22] Filed: Sep. 17, 1976

[51] Int. Cl.$^2$ .................... G06F 7/50; H01D 11/14
[52] U.S. Cl. .................... 364/784; 307/216; 307/304
[58] Field of Search .............. 235/168, 173, 175; 307/205, 216, 304; 364/784

[56] References Cited

U.S. PATENT DOCUMENTS

| | | | |
|---|---|---|---|
| 3,427,445 | 2/1969 | Dailey | 235/175 |
| 3,777,186 | 12/1973 | Chang | 307/304 |
| 3,937,985 | 2/1976 | Cooper, Jr. | 307/304 X |
| 3,995,172 | 11/1976 | Freeman et al. | 307/216 X |

*Primary Examiner*—Jerry Smith
*Attorney, Agent, or Firm*—Robert W. Keller; John J. Connors

[57] ABSTRACT

A logic gate utilizing charge transfer structures is disclosed which forms the building block for a TWO (2)-INPUT ADDER (HALF ADDER) and a THREE (3)-INPUT ADDER (FULL ADDER). The logic gate includes a first storage gate for receiving charge packets representing binary digital input signals. The storage gate couples in a first path to a first transfer gate which allows the storage gate to store only one unit quantity Q of charge and to transfer any excess quantity of charge to a master gate. The master gate is connected to a slave gate which causes the latter to operate as a barrier gate when the master gate contains a unit quantity Q of charge or to operate as a transfer gate when the master gate contains no charge. A control gate couples the first storage gate in a second path to the slave gate. The control gate exercises control over the transfer of charge in the second path until such time as the master gate can receive and store the excess charge from the first storage gate and thereby determine the appropriate state of the slave gate before the second path is allowed to transfer charge from the first storage gate.

7 Claims, 2 Drawing Figures

LOGIC GATE UTILIZING CHARGE TRANSFER DEVICES

The invention herein described was made in the course of or under a contract or subcontract thereunder with the Department of the Navy.

BACKGROUND OF THE INVENTION

This invention relates generally to logic devices, and more particularly to devices capable of performing digital arithmetic functions and in utilizing structures relying on the transfer of charge through a semiconductor body.

In U.S. Pat. No. 3,777,186 issued Dec. 4, 1973 to Wen H. Chang there are described various logic devices utilizing charge transfer structures. Among the devices described in an EXCLUSIVE OR gate which includes three electrodes forming an AND gate, a control electrode, and an EXCLUSIVE OR output electrode. Experimental operation of such a device has shown that under certain normal operating conditions the control electrodes will not effectively control the flow of charge to the EXCLUSIVE OR output electrode. As a result of the ineffectiveness of the control electrode to control the flow of charge, a condition will exist where charge which should have been inhibited by the control electrode from reaching the EXCLUSIVE OR output electrodes will in fact arrive at the latter. Therefore, an erroneous indication will occur at the EXCLUSIVE OR output electrode.

SUMMARY OF THE INVENTION

In accordance with the invention, a logic state is provided that can perform an EXCLUSIVE OR (HALF ADDER) function and also serves as a building block for a FULL ADDER as well as higher order adders. Such a logic gate is provided by employing an additional control gate in a structure of the general kind disclosed in the above-identified Chang patent.

According to one embodiment of a first storage gate is provided for receiving two or more charge packets, representing binary digital bits and containing a predetermined quantity of charge Q. A first transfer gate is coupled to the first storage gate for allowing the transfer therethrough of charge in excess of a charge packet Q from the first storage gate.

A non-destructive charge sensing element has a master gate directly connected to a slave gate. The master gate receives and stores the excess of charge above the quantity Q that is transferred by way of the first transfer gate from the first storage gate. The slave gate operates as a transfer gate for charge transfer if, and only if, no charge is stored at the master gate. If, and only if, charge is stored at the master gate, the slave gate operates as a barrier gate to charge transfer.

A control gate couples the first storage gate to the slave gate. During an interval of time required for charge from the first storage gate to be deposited at and be detected by the master gate, the control gate acts as a barrier gate to inhibit charge transfer from the first storage gate to the slave gate. At the expiration of the time interval the control gate acts as a transfer gate for allowing the transfer of charge from the first storage gate to the slave gate.

Means are provided for utilizing the charge packets Q that are present at the slave and/or master gates. For a two input adder, the utilization means includes output gates from which signals can be derived which represent the least significant bit and most significant bit of the sum respectively.

A three input adder is disclosed which includes, in addition to the elements of the basic logic gate, elements for generating the required three input charge packets Q and further elements which utilize the charge packets Q that are present at the slave and master gates in such a way as to produce the required three bit addition.

DESCRIPTION OF THE PREFERRED EMBODIMENTS

The embodiments to be described incorporate logic devices in charge coupled or charge transfer structures similar to those disclosed in the above-identified U.S. Pat. No. 3,777,186. The operation of such logic devices is adequately described in the patent. Similarly, charge coupled or charge transfer devices are well known and the details of fabrication and operation of such devices need not be discussed herein. It will suffice to say that where used herein, the term gate is interchangeable with the term electrodes as used in the Chang patent. That is, a gate is a structure which may be made of a suitable metal such as (but not limited to) aluminum or polysilicon deposited on an insulator of suitable material and thickness covering a suitably doped semiconductor substrate. For ease in description the specific devices herein described will be surface channel types and will be composed of an n-type silicon substrate, requiring negative voltages applied to the gates (electrodes) for proper operation. It is understood, however, that the principles of the invention are not limited to such structures and are applicable to buried channel as well as surface channel devices on n-type or p-type substrates.

Figure 1:
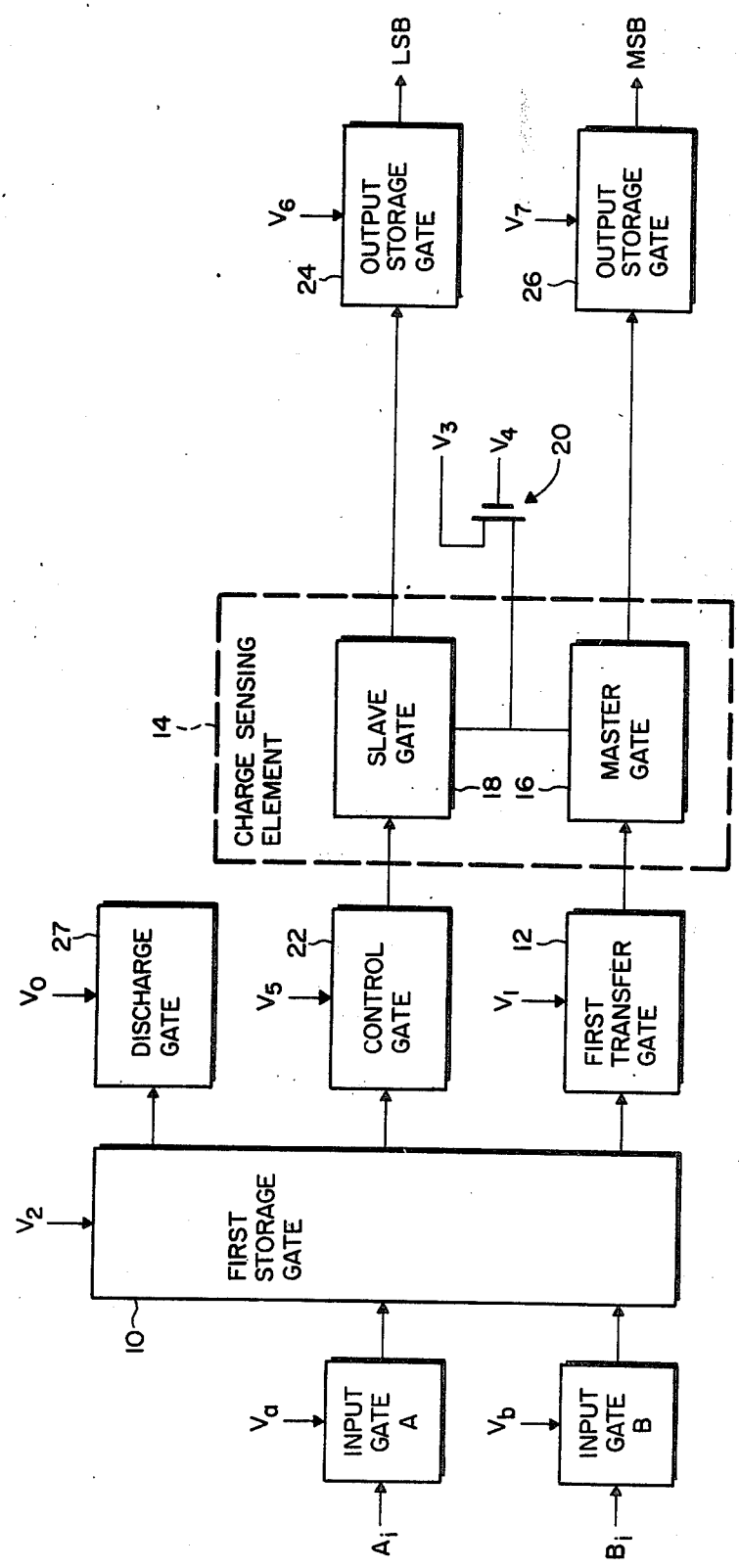
FIG. 1 is a block diagram of a two input adder incorporating the logic gate according to the invention.

Referring now to FIG. 1, an example of the logic gate according to the invention is shown embodied in an EXCLUSIVE OR gate, or HALF ADDER. A pair of binary digital signals $A_i$ and $B_i$ are applied to a pair of input gates A and B respectively, which convert the binary digital signals into charge packets, each of quantity Q. The size of the quantity Q is determined by the voltages $V_a$ and $V_b$ applied to the input gates A and B respectively and the surface area of the input gates A and B.

The packets of charge Q as determined by the input gates A and B are simultaneously applied to a first storage gate 10. A first transfer gate 12, which is coupled to the first storage gate 10, is biased by a voltage $V_1$ such that the first storage gate 10 will retain only one charge packet Q thereat when a voltage $V_2$ is applied to the first storage gate 10.

A sensing element 14 which is comprised of a master gate 16 and a slave gate 18, has its master gate 16 coupled to the first transfer gate 12. The master gate 16 is prepared to accept the excess charge packet Q, if available from the storage gate 10, by applying a voltage $V_3$ to the master and slave gates 16 and 18 simultaneously. The voltage $V_3$ is applied when a field effect transistor (FET) 20 is turned on by a voltage $V_4$ applied to the gate of the FET 20. The voltage $V_3$ remains on the sensing element 14 when the FET 20 is turned off by the removal of the voltage $V_4$. The voltage $V_4$ is applied to the FET 20 during or just prior to the application of the voltage $V_2$ to the first storage gate 10.

If, and only if, excess charge Q exists at the master gate 16, then and only then, the slave gate 18 acts as a barrier gate to the flow of charge. Otherwise, it behaves as a transfer gate to the flow of charge.

In accordance with the invention, a control gate 22 is arranged to control the flow of charge from the first storage gate 10 to the slave gate 18. This is accomplished as follows. During the time interval input gate A and B are dumping their charge packets into the first storage gate 10, a voltage $V_5$ is of such magnitude relative to the voltage $V_2$ applied to the first storage gate 10, that when applied to the control gate 22, it causes the control gate 22 to inhibit the flow of charge from the first storage gate 10 to the slave gate 18. This condition is allowed to exist until such time as any excess charge packet Q, which may be transferred from the first storage gate 10 by the first transfer gate 12, can reside at the master gate 16 and thereby determine whether the slave gate 18 functions as a barrier gate or a transfer gate. When sufficient time has elapsed to permit the slave gate 18 to establish its barrier or transfer state, the magnitude of the voltage $V_5$ is changed to a value such that when applied to the control gate 22, it causes the control gate 22 to permit the flow of the charge packet Q residing at the first storage gate 10 to the slave gate 18. Without the control gate 22 there would be nothing to prevent the slave gate 18 from transferring charge from the first storage gate 10 before it has had time to establish its proper state by responding to the presence or absence of charge in the master gate. Thus a race condition could exist between the slave gate 18 and master gate 16 as to which of these gates will be the first to transfer charge from the first storage gate 10.

Upon application of a voltage $V_6$, an output storage gate 24 which is coupled to the slave gate 18 accepts and stores the charge packet Q which is allowed to be transferred by the slave gate 18. The charge packet Q stored at the output gate 24 represents the least significant bit (LSB) of the sum.

Upon application of a voltage $V_7$, subsequent to the application of voltage $V_6$, a second output storage gate 26 coupled to the master gate 16 of the sensing element 14, accepts and stores the excess of charge packet Q residing at the master gate 16, if available. The excess of charge so stored at the output gate 26 represents the most significant bit of the sum.

The output gates 24 and 26 above-described constitute the means employed in the basic logic gate for utilizing the charge packets Q that are present at the slave and master gates of the charge sensing element 14 in such a way as to produce the sum output of the TWO INPUT or HALF ADDER.

A discharge gate 27, operable upon application of a voltage $V_0$ is coupled to the first storage gate 10 to clear all residue charge which may be present at the storage gate 10 at the expiration of each period of operation.

The truth table for the TWO (2) INPUT ADDER is given below:

| TRUTH TABLE | | | |
|---|---|---|---|
| INPUTS | | OUTPUTS | |
| $A_i$ | $B_i$ | LSB | MSB |
| 0 | 0 | 0 | 0 |
| 0 | 1 | 1 | 0 |
| 1 | 0 | 1 | 0 |
| 1 | 1 | 0 | 1 |

Figure 2:
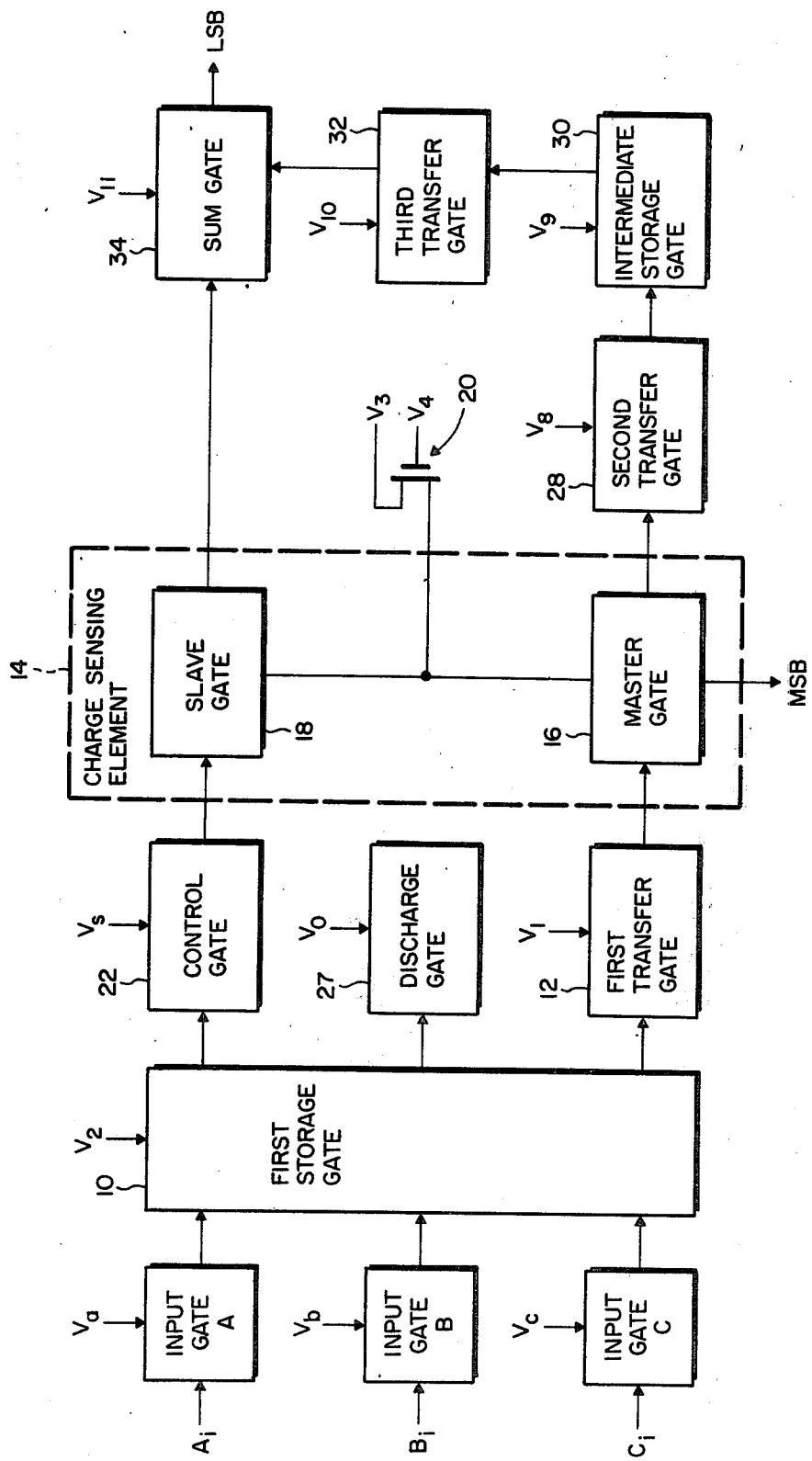
FIG. 2 is a block diagram of a three input adder incorporating the logic gate according to the invention.

FIG. 2 is a block diagram of a THREE (3) INPUT ADDER embodying the logic gate according to the invention. The THREE (3) INPUT ADDER includes the elements of the basic logic gate which are the first storage gate 10, the first transfer gate 12, the charge sensing element 14, the control gate 22, and the discharge gate 27. In addition to the elements of the basic logic gate, the THREE INPUT ADDER includes additional elements for generating the required three input charge packets each of quantity Q, and further elements which utilize the charge packets Q that are present at the slave and master gates of the charge sensing element 14 in such a way as to produce the required three bit addition. Whereas the TWO INPUT ADDER of FIG. 1 has two input gates A and B, the THREE INPUT ADDER requires, in addition to the two input gates A and B, a third gate C which converts the third binary digital signal $C_i$ into the required third charge packet Q when the third voltage $V_c$ is applied to the third input gate C.

The THREE INPUT ADDER also includes a second transfer gate 28, an intermediate storage gate 30, a third transfer gate 32, and a sum gate 34. The second transfer gate 28, which is coupled to the master gate 16 of the charge sensing element 14, is biased by a voltage $V_8$ of such value that the master gate 16 of the charge sensing element 14 will retain only one charge packet Q thereat when a second excess charge packet Q is generated by the input gates A, B and C. This second excess charge Q is allowed to transfer to the intermediate storage gate 30, when a voltage $V_9$ is applied thereto, while causing a charge packet Q to be retained at the master gate 16. The voltage $V_8$ is applied to the second transfer gate 28 at the same time that the voltage $V_1$ is applied to the first transfer gate 12. The voltage $V_9$ is applied to the intermediate storage gate 30 at the time that the voltage $V_2$ is applied to the first storage gate 10.

The third transfer gate 32 which couples the intermediate storage gate 30 to the sum gate 34, transfers the charge packet Q residing at the intermediate storage gate 30 to the sum gate 34 when a voltage $V_{10}$ is applied to the third transfer gate 32 and a voltage $V_{11}$ is applied to the sum gate 34. The voltage $V_{11}$ is applied prior to voltage $V_{10}$. The sum gate 34 is coupled to the slave gate 18 as well as to the third transfer gate 32, and therefore will accept charge from the first storage gate 10 by way of the control gate 22 and the slave gate 18 providing no charge resides at the master gate 16. If a charge packet Q resides at the master gate 16 and another charge packet Q resides at the intermediate storage gate 30, the sum gate 34 can accept only the charge packet Q that resides at the intermediate storage gate 30 by way of the third transfer gate 32. It will be recalled that the slave gate 18 presents a barrier to charge transfer from the first storage gate 10 when a charge packet Q resides at the master gate 16 and therefore does not allow the charge packet Q residing at the first storage gate 10 to be transferred to the sum gate 34.

The charge residing at the sum gate 34 represents the least significant bit of the sum and the charge stored at the master gate 16 represents the most significant bit of the sum.

The truth table for the THREE (3) INPUT ADDER is given below:

| TRUTH TABLE | | | | |
|---|---|---|---|---|
| INPUTS | | | OUTPUTS | |
| A | B | C | LSB | MSB |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

We claim:

1. A logic gate, comprising:
 (a) a first storage gate capable of receiving a first and a second charge packet, each containing a predetermined quantity of charge Q representative of a binary bit;
 (b) a first transfer gate coupled to said first storage gate for allowing the transfer therethrough of charge at said first storage gate in excess of the quantity Q;
 (c) a charge sensing element having a master gate and a slave gate, said master gate being responsive to the excess of charge above said quantity Q that is transferred by said first transfer gate, said slave gate being directly connected to said master gate and acting as a transfer gate for charge transfer if, and only if, no charge is present at said master gate, and acting as a barrier gate for charge transfer if, and only if, charge is present at said master gate;
 (d) a control gate coupling said first storage gate to said slave gate, said control gate having a barrier state for inhibiting the transfer of charge from said first storage gate to said slave gate during the time interval required for charge from said first storage gate to reside at said master gate, said control gate also having a transfer state for the transfer of charge after the expiration of said time interval, and
 (e) means coupled to at least one of said slave and master gates for utilizing the individual charge packets Q that are present at said slave and master gates.

2. The invention according to claim 1 and further including means for applying a voltage of such magnitude to said control gate for inhibiting the transfer of charge from said storage gate to said slave gate during the time interval specified in (d), and means for changing the voltage on said control gate to a different magnitude for permitting the transfer of charge from said storage gate to said slave gate after the expiration of said time interval.

3. A logic gate as recited in claim 1 wherein said charge sensing element is of the non destructive type.

4. A TWO INPUT ADDER, comprising:
 (a) a first storage gate for receiving two charge packets representing digital bits each containing a predetermined quantity of charge Q;
 (b) a first transfer gate coupled to said first storage gate for allowing the transfer therethrough of charge in said first storage gate in excess of the quantity Q;
 (c) a non-destructive charge sensing element having a master gate for receiving and storing the excess of charge above said quantity Q that is transferred by said first transfer gate from said first storage gate, said charge sensing element also having a slave gate which is directly connected to said master gate and which acts as a transfer gate for charge transfer if, and only if, no charge is stored in said master gate, and which acts as a barrier gate for charge transfer if, and only if, charge is stored in said master gate;
 (d) a control gate coupling said first storage gate to said slave gate, said control gave having a barrier state for inhibiting the transfer of charge from said first storage gate to said slave gate during the time interval required for charge from said first storage gate to reside at said master gate, said control gave also having a transfer state for the transfer of charge after the expiration of said time interval, and
 (e) means for utilizing the charge packet that is present at said slave gate to provide a first signal which represents the least significant bit of the sum, and means for utilizing the charge packet that is present at said master gate to provide a second signal which represents the most significant bit of the sum.

5. The invention according to claim 4 wherein the means in (e) includes first and second output storage gates coupled to said slave gate and said master gate, respectively, for receiving the charge packets, if any, residing at said slave gate and master gate.

6. The invention according to claim 5 and further including means for applying a first voltage to the output gate that is coupled to said slave gate to transfer charge representing the least significant bit, and means for subsequently applying a second voltage to the output gate that is coupled to said master gate to transfer charge representing the most significant bit.

7. A THREE INPUT ADDER, comprising:
 (a) a first storage gate for receiving three charge packets representing three binary digital bits each containing a predetermined quantity of charge Q;
 (b) a first transfer gate coupled to said first storage gate for allowing the transfer therethrough of charge in said first storage gate in excess of the quantity Q;
 (c) a non-destructive charge sensing element having a master gate for receiving and storing the excess of charge above said quantity Q that is transferred by said first transfer gate from said first storage gate, said charge sensing element also having a slave gate which is directly connected to said master gate and which acts as a transfer gate for charge transfer if, and only if, no charge is stored in said master gate, and which acts as a barrier gate for charge transfer if, and only if, charge is stored in said master gate;
 (d) a control gate coupling said first storage gate to said slave gate, said control gate having a barrier state for inhibiting the transfer of charge from said first storage gate to said slave gate during the time interval required for charge from said first storage gate to reside at said master gate, said control gate also having a transfer state for the transfer of charge after the expiration of said time interval;

(e) a second transfer gate coupled to said master gate for allowing the transfer therethrough of charge in said master gate in excess of the quantity Q;

(f) an intermediate storage gate coupled to said second transfer gate for receiving and storing the excess of charge above said quantity Q that is transferred by said second transfer gate from said master gate;

(g) a third transfer gate coupled to said intermediate storage gate for allowing all charge stored in the intermediate storage gate to be transferred therethrough;

(h) a sum gate coupled to both said third transfer gate and said slave gate for receiving charge of said quantity Q that is transferred from said third transfer gate and said slave gate; and (i) means for utilizing the charge that is present at the sum gate to provide a first signal which represents the least significant bit of the sum, and means for utilizing the charge that is present at said master gate to provide a second signal which represents the most significant bit of the sum.